United States Patent
Sundaram Ramasamy et al.

(10) Patent No.: US 12,358,450 B2
(45) Date of Patent: Jul. 15, 2025

(54) ROTATABLE SEATBELT BUCKLE

(71) Applicant: Ford Global Technologies, LLC, Dearborn, MI (US)

(72) Inventors: Murugan Sundaram Ramasamy, Canton, MI (US); Mangesh Kadam, Canton, MI (US); Srinivas Reddy Malapati, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 18/473,631

(22) Filed: Sep. 25, 2023

(65) Prior Publication Data

US 2025/0100494 A1   Mar. 27, 2025

(51) Int. Cl.
| | | |
|---|---|---|
| *B60R 21/01* | (2006.01) | |
| *B60R 22/26* | (2006.01) | |
| *B60R 22/18* | (2006.01) | |

(52) U.S. Cl.
CPC .............. *B60R 21/01* (2013.01); *B60R 22/26* (2013.01); *B60R 2021/01265* (2013.01); *B60R 2021/01286* (2013.01); *B60R 2022/1806* (2013.01); *B60R 2022/1812* (2013.01)

(58) Field of Classification Search
CPC .................... B60R 21/01; B60R 22/26; B60R 2021/01265; B60R 2021/01286; B60R 2022/1806; B60R 2022/1812
See application file for complete search history.

(56) References Cited

U.S. PATENT DOCUMENTS

| | | |
|---|---|---|
| 5,431,448 A | 7/1995 | Ball et al. |
| 5,730,500 A | 3/1998 | Cardona |
| 6,213,513 B1 | 4/2001 | Grabowski et al. |
| 6,308,986 B1 | 10/2001 | Townsend et al. |
| 6,474,691 B2 | 11/2002 | Izume et al. |
| 6,572,147 B2 | 6/2003 | Webber et al. |

(Continued)

FOREIGN PATENT DOCUMENTS

| | | |
|---|---|---|
| DE | 102014210623 A1 | 12/2015 |
| EP | 0802095 A2 | 1/2001 |

(Continued)

OTHER PUBLICATIONS

Notice of Allowance dated Aug. 19, 2024 re U.S. Appl. No. 18/473,683, filed Sep. 25, 2023.

*Primary Examiner* — Xiao En Mo
(74) *Attorney, Agent, or Firm* — Frank A. MacKenzie; Brooks Kushman P.C.

(57) ABSTRACT

A vehicle includes a vehicle seat and a plate fixed relative to the vehicle seat. A seatbelt buckle is rotatably supported by the vehicle seat. The seatbelt buckle is rotatable relative to the plate from a first position to a second position. A slot is in one of the plate and the seatbelt buckle and a pin is supported by the other of the plate and the seatbelt buckle. The pin is moveable relative to the other of the plate and the seatbelt buckle from a retracted position to an extended position. The pin is spaced from the slot and in the retracted position when the seatbelt buckle is in the first position. The pin is in the extended position and extends into the slot when the seatbelt buckle is in the second position. A pyrotechnic device is operatively coupled to the seatbelt buckle to rotate the seatbelt buckle.

18 Claims, 12 Drawing Sheets

(56) References Cited

U.S. PATENT DOCUMENTS

| | | | |
|---|---|---|---|
| 7,516,987 | B2 | 4/2009 | Koide et al. |
| 8,376,407 | B2 | 2/2013 | Adolfsson et al. |
| 8,606,465 | B2 | 12/2013 | Wang et al. |
| 8,851,522 | B1 | 10/2014 | Srugis et al. |
| 9,725,022 | B2 | 8/2017 | Shenaq et al. |
| 10,144,387 | B1 | 12/2018 | Jaradi et al. |
| 10,988,062 | B2 | 4/2021 | Sekizuka |
| 11,345,306 | B1 | 5/2022 | Jaradi et al. |
| 2002/0089164 | A1 | 7/2002 | Rouhana et al. |
| 2010/0219667 | A1 | 9/2010 | Merrill et al. |
| 2012/0025588 | A1 | 2/2012 | Humbert et al. |
| 2014/0021710 | A1* | 1/2014 | Rao ............... B60R 22/1951 280/806 |
| 2019/0135227 | A1 | 5/2019 | Jaradi et al. |
| 2019/0291685 | A1 | 9/2019 | Ohno |
| 2020/0339063 | A1* | 10/2020 | Jaradi ............... B60R 21/013 |
| 2020/0346603 | A1 | 11/2020 | Freedman et al. |
| 2022/0063552 | A1 | 3/2022 | Son et al. |
| 2023/0202423 | A1 | 6/2023 | Kini et al. |
| 2024/0140352 | A1 | 5/2024 | Schneider et al. |

FOREIGN PATENT DOCUMENTS

| | | |
|---|---|---|
| EP | 0802096 B1 | 7/2001 |
| FR | 2695893 A1 | 10/1994 |
| FR | 2843571 A1 | 4/2005 |
| GB | 2433475 A | 6/2007 |
| KR | 1998039188 U | 9/1998 |
| KR | 1998046791 U | 9/1998 |
| KR | 20030016695 A | 3/2003 |
| KR | 1020060127492 A | 12/2006 |
| KR | 101232458 B1 | 2/2013 |

\* cited by examiner

ROTATABLE SEATBELT BUCKLE

BACKGROUND

A vehicle includes a seatbelt assembly. The seatbelt assembly may include a seatbelt retractor and a webbing retractably payable from the seatbelt retractor. The seatbelt assembly includes an anchor coupled to the webbing, and a latch plate that engages a seatbelt buckle. The seatbelt assembly is disposed adjacent to a seat of the vehicle. The webbing extends continuously from the seatbelt retractor to the anchor. For example, one end of the webbing feeds into the seatbelt retractor, and the other end of the webbing is fixed to the anchor.

DETAILED DESCRIPTION

Figure 1:
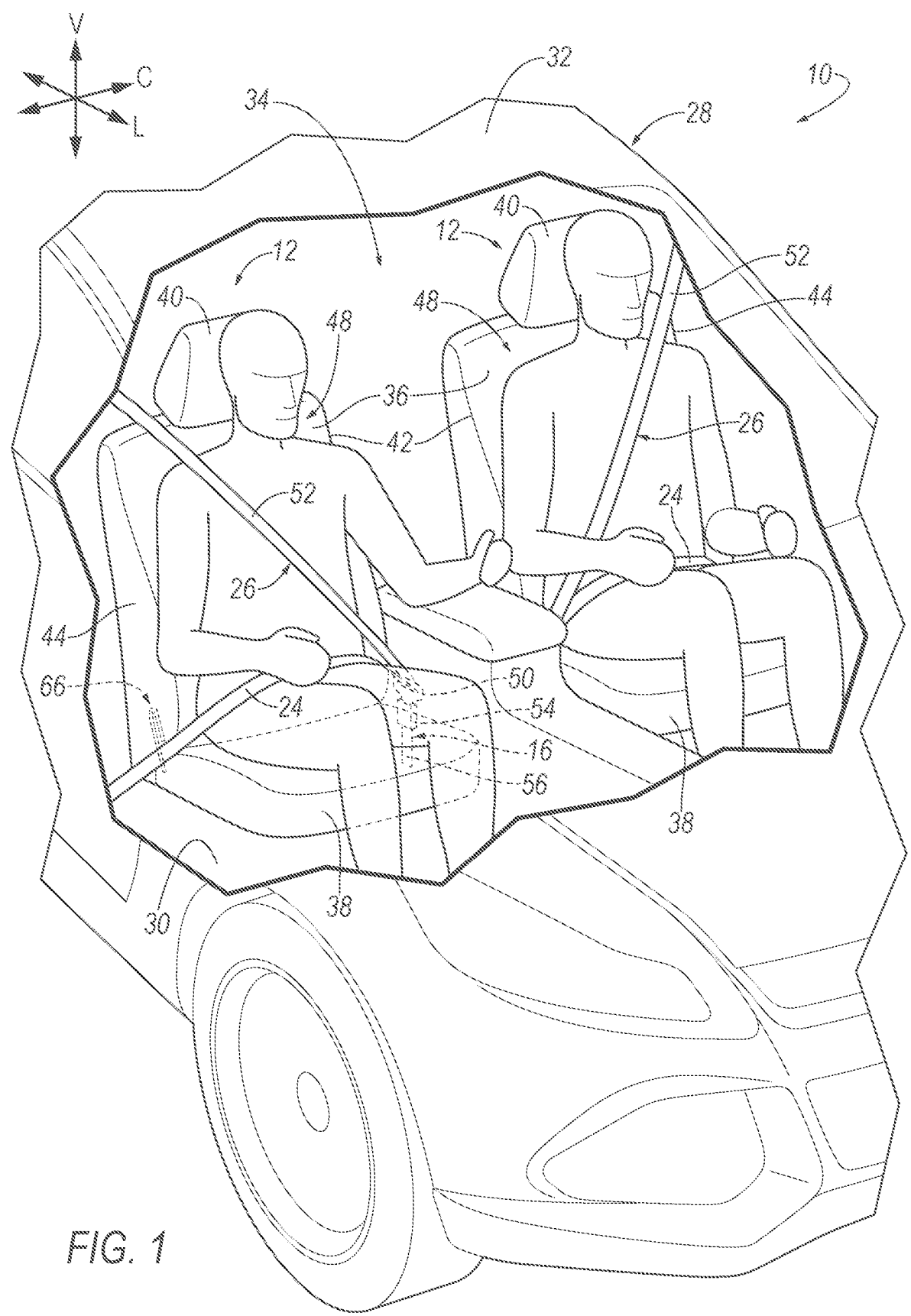
FIG. 1 is a perspective view of a vehicle.
Figure 2:
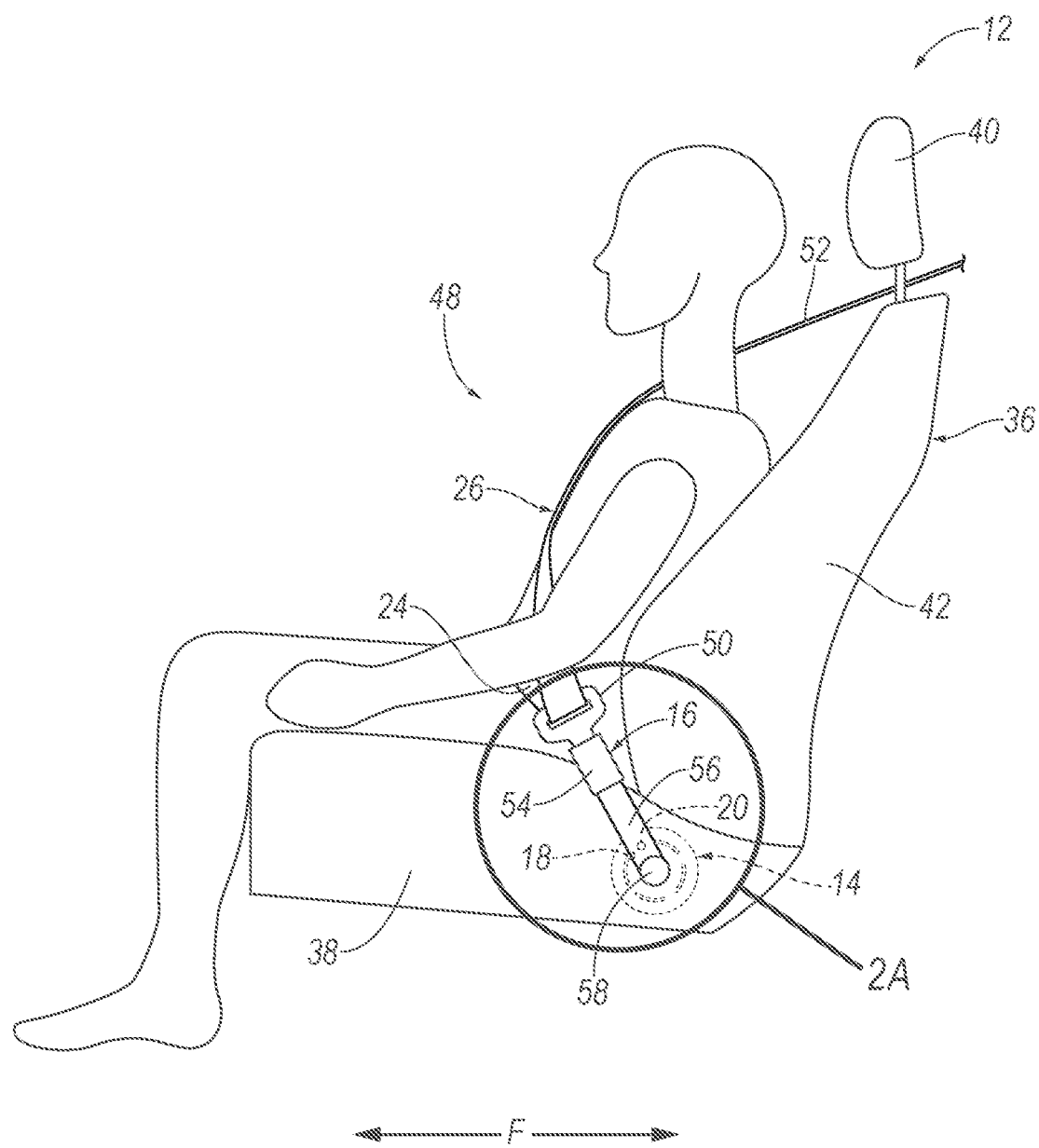
FIG. 2 is a first side view of a vehicle seat having a seatbelt buckle in a first position.
Figure 2A:
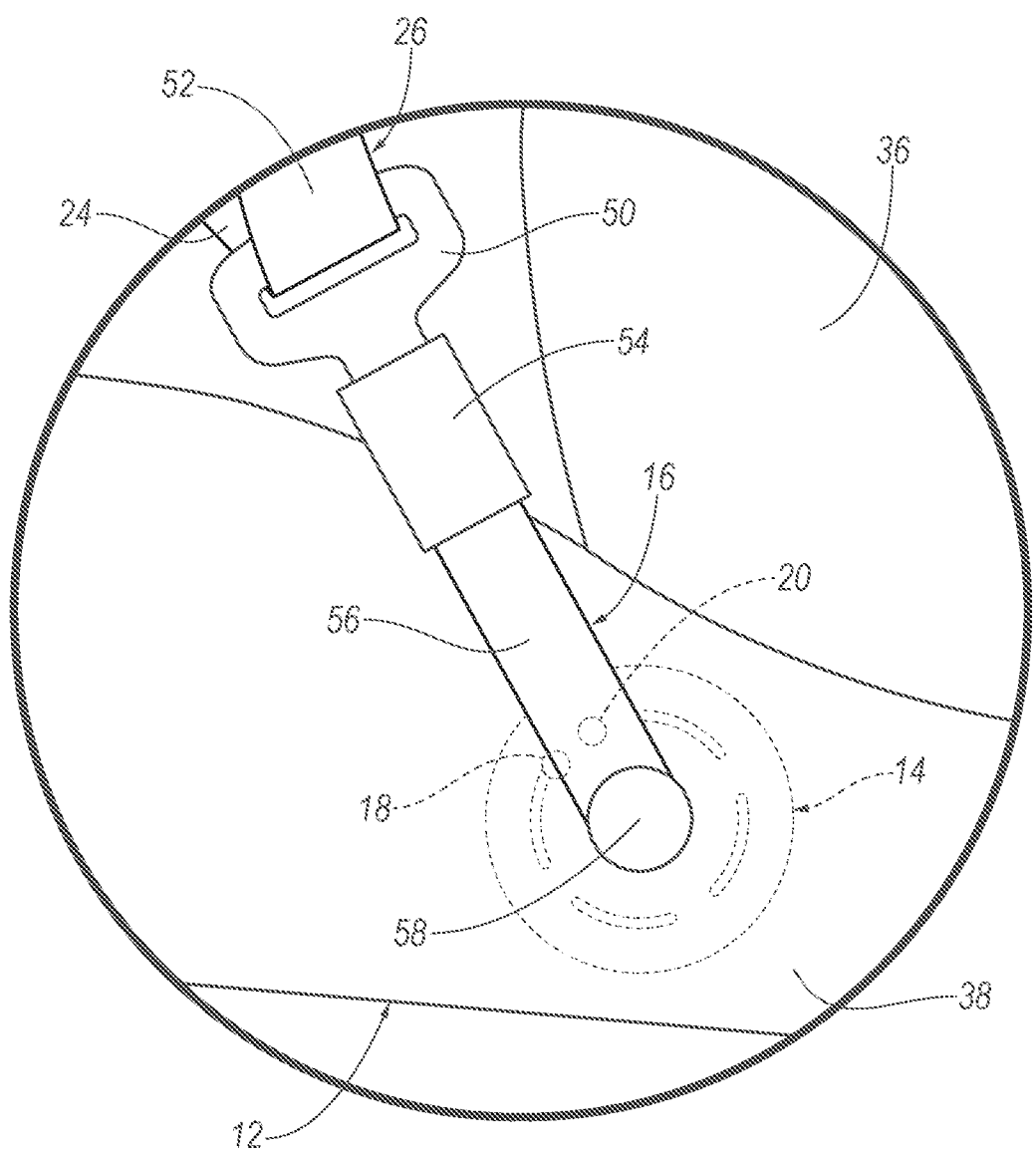
FIG. 2A is a side view of the seatbelt buckle in the first position.
Figure 3:
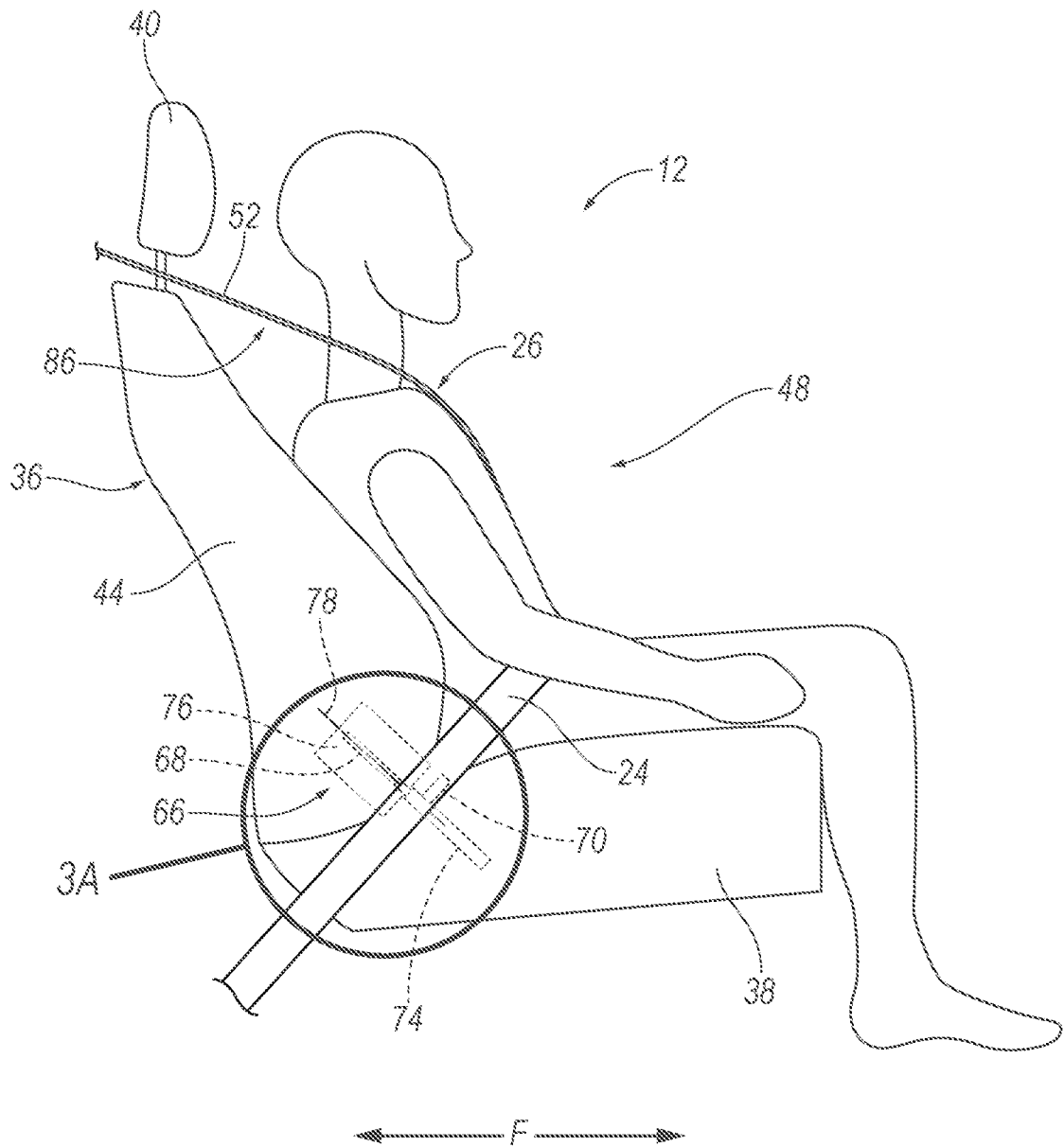
FIG. 3 is a second side view of the vehicle seat having a hook assembly in a first position.
Figure 3A:
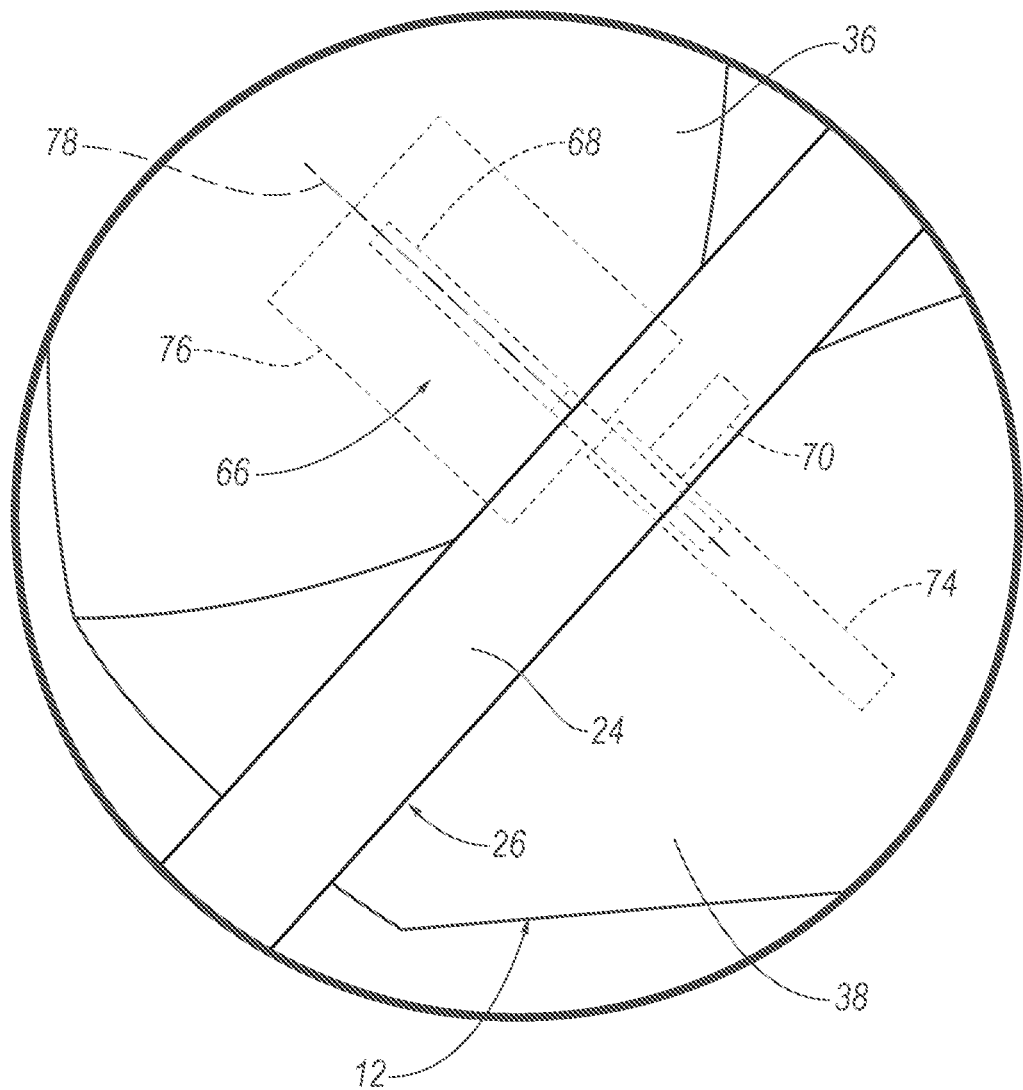
FIG. 3A is a side view of the hook assembly in the first position.

A vehicle includes a vehicle seat and a plate fixed relative to the vehicle seat. The vehicle includes a seatbelt buckle rotatably supported by the vehicle seat. The seatbelt buckle is rotatable relative to the plate from a first position to a second position. The vehicle includes a slot in one of the plate and the seatbelt buckle and a pin supported by the other of the plate and the seatbelt buckle. The pin is moveable relative to the other of the plate and the seatbelt buckle from a retracted position to an extended position. The pin is spaced from the slot and in the retracted position when the seatbelt buckle is in the first position. The pin is in the extended position and extending into the slot when the seatbelt buckle is in the second position. The vehicle includes a pyrotechnic device operatively coupled to the seatbelt buckle to rotate the seatbelt buckle from the first position to the second position.

The vehicle seat may include a seatback with the seatbelt buckle being rotatable away from the seatback from the first position to the second position.

The vehicle seat may include a seat bottom with the plate being fixed relative to the seat bottom and the seatbelt buckle being rotatable relative to the seat bottom.

The seatbelt buckle may be rotatable relative to the vehicle seat in a seat-forward direction.

The seatbelt buckle may be rotatable about a rotational axis parallel to a cross-seat axis.

The pin is spaced from the rotational axis.

The vehicle may include a latch plate engageable with the seatbelt buckle with the pin being moveable from the retracted position to a second retracted position when the latch plate is engaged with the seatbelt buckle.

The pin may abut the other of the plate and the seatbelt buckle in the second retracted position. The pin may be slidable along the other of the plate and the seatbelt buckle as the seatbelt buckle moves from the first position to the second position.

The vehicle may include a webbing with the latch plate being moveable along the webbing to define a lap portion and the lap portion being moveable in a seat-forward direction as the seatbelt buckle moves from the first position to the second position.

The vehicle may include a latch plate engageable with the seatbelt buckle and an actuator biasing the pin toward the extended position in response to detected engagement of the latch plate with the seatbelt buckle.

The vehicle may include a computer including a processor and a memory storing instructions executable by the processor to bias the pin toward the extended position in response to detected engagement of the latch plate with the seatbelt buckle and to bias the pin to the retracted position in response to detected disengagement of the latch plate with the seatbelt buckle.

The memory stores instructions executable by the processor may include to actuate the pyrotechnic device to rotate the seatbelt buckle from the first position to the second position in response to detection of certain vehicle impacts.

The pin may abut the other of the plate and the seatbelt buckle in the retracted position.

The pin may move in a cross-seat direction from the retracted position to the extended position.

The seatbelt buckle may be rotatable about a rotational axis with the pin being spaced from the rotational axis along the seatbelt buckle and the slot is spaced from the rotational axis along the plate.

The vehicle may include a solenoid including the pin.

The pin may be biased toward the slot in the extended position.

The vehicle may include a computer including a processor and a memory storing instructions executable by the processor to actuate the pyrotechnic device to rotate the seatbelt buckle from the first position to the second position in response to detection of certain vehicle impacts.

Figure 4:
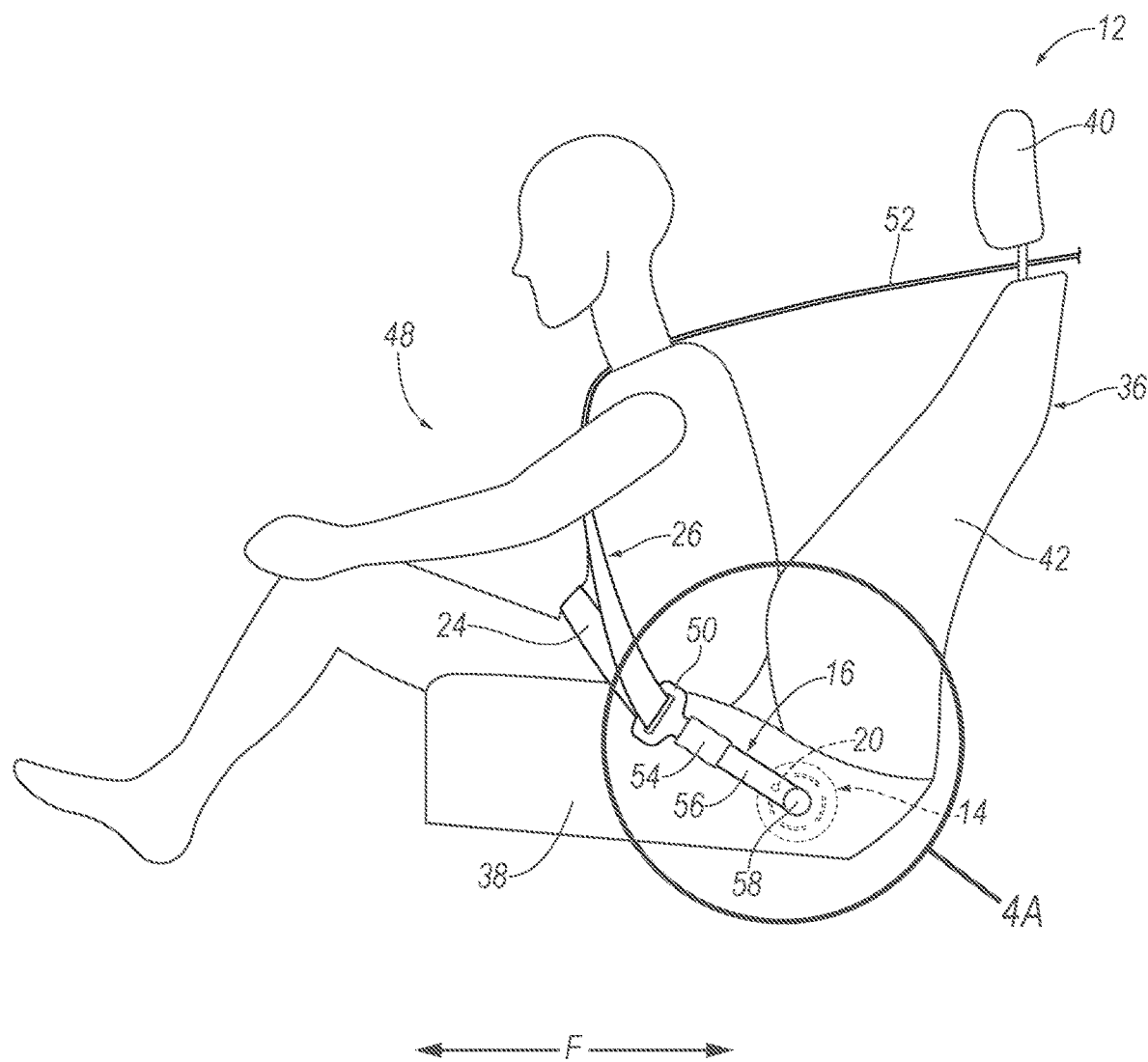
FIG. 4 is a side view of the vehicle seat having the seatbelt buckle in a second position.

With reference to the Figures, wherein like numerals indicate like parts throughout the several views, a vehicle 10 includes a vehicle seat 12 and a plate 14 fixed relative to the vehicle seat 12. A seatbelt buckle 16 is rotatably supported by the vehicle seat 12. The seatbelt buckle 16 is rotatable relative to the plate 14 from a first position (FIG. 1) to a second position (FIG. 4). The vehicle 10 includes a slot 18 in one of the plate 14 and the seatbelt buckle 16 and a pin 20 supported by the other of the plate 14 and the seatbelt buckle 16. The pin 20 is moveable relative to the other of the plate 14 and the seatbelt buckle 16 from a retracted position, hereinafter referred to as the "first retracted position," to an extended position. The pin 20 is spaced from the slot 18 and in the first retracted position when the seatbelt buckle 16 is in the first position. The pin 20 is in the extended position and extends into the slot 18 when the seatbelt buckle 16 is in the second position. The vehicle 10 includes a pyrotechnic device 22 (FIGS. 6A-C), hereinafter referred to as the "first pyrotechnic device 22," operatively coupled to the seatbelt buckle 16 to rotate the seatbelt buckle 16 from the first position (FIG. 1) to the second position (FIG. 4).

In the event of these certain vehicle impacts, the seatbelt buckle 16 rotates relative to the seat 12 and a torso of the occupant to move a lap portion 24 of a seatbelt webbing 26, hereinafter referred to as "webbing 26," seat-forward along the torso of the occupant. The pyrotechnic device 22 activates to rotate the seatbelt buckle 16 seat-forward in the event of certain vehicle impacts. As the seatbelt buckle 16 rotates, the pin 20 engages with the slot 18 to maintain the seatbelt buckle 16 in the second position in the event of certain vehicle impacts.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 10 defines a vehicle-longitudinal axis L extending between a front vehicle end (not numbered) and a rear vehicle end (not numbered) of the vehicle 10. The vehicle 10 defines a cross-vehicle axis C extending cross-vehicle from one side to the other side of the vehicle 10. The vehicle 10 defines a vertical axis V. The vehicle-longitudinal axis L, the cross-vehicle axis C, and the vertical axis V are perpendicular relative to each other.

As described further below, the vehicle 10 includes a vehicle body 28 including rockers (not numbered), roof rails (not shown), roof beams (not shown), pillars (not numbered), body panels (not numbered), vehicle floor 30, vehicle roof 32, etc. The vehicle 10 includes a passenger compartment 34 to house occupants, if any, of the vehicle 10. The passenger compartment 34 may extend across the vehicle 10, i.e., from one side to the other side of the vehicle 10. The passenger compartment 34 includes a front end (not numbered) and a rear end (not shown) with the front end being in front of the rear end during forward movement of the vehicle 10.

The vehicle roof 32 and the vehicle floor 30 are spaced from each other. Specifically, the vehicle floor 30 is spaced downwardly from the vehicle roof 32. The vehicle roof 32 defines the upper boundary of the passenger compartment 34 and may extend from the front end of the passenger compartment 34 to the rear end of the passenger compartment 34. The vehicle roof 32 may include a roof panel (not numbered) extending from one side of the vehicle 10 to the other. As an example, the roof panel may be attached to roof rails, e.g., by welding, fasteners, etc.

The vehicle 10 includes the vehicle floor 30 defining the lower boundary of the passenger compartment 34 and may extend from the front end of the passenger compartment 34 to the rear end of the passenger compartment 34. The vehicle floor 30 may include upholstery, for example, carpet, and may have a class-A surface facing the passenger compartment 34, i.e., a surface specifically manufactured to have a high quality, finished, aesthetic appearance free of blemishes.

With continued reference to FIG. 1, the vehicle 10 may include one or more vehicle seats 12, hereinafter referred to as "seats 12." Specifically, the vehicle 10 may include any suitable number of seats 12. As shown in FIG. 1, the seats 12 are supported by the vehicle floor 30. The seats 12 may be arranged in any suitable arrangement in the passenger compartment 34. As in the example shown in the Figures, one or more of the seats 12 may be at the front end of the passenger compartment 34, e.g., a driver seat and/or a passenger seat. In other examples, one or more of the seats 12 may be behind the front end of the passenger compartment 34, e.g., at the rear end of the passenger compartment 34. The seats 12 may be moveable relative to the vehicle floor 30 to various positions, e.g., moveable fore-and-aft and/or cross-vehicle. The seat 12 may be of any suitable type, e.g., a bucket seat.

The seats 12 include a seatback 36, a seat bottom 38, and a head restraint 40. The head restraint 40 may be supported by and extend upwardly from the seatback 36. The head restraint 40 may be stationary or moveable relative to the seatback 36. The seatback 36 may be supported by the seat bottom 38 and may be stationary or moveable relative to the seat bottom 38. The seatback 36, the seat bottom 38, and the head restraint 40 may be adjustable in multiple degrees of freedom. Specifically, the seatback 36, the seat bottom 38, and the head restraint 40 may themselves be adjustable. In other words, adjustable components within the seatback 36, the seat bottom 38, and the head restraint 40 may be adjustable relative to each other.

The seats 12 includes a first side 42 and a second side 44 spaced cross-seat from the first side 42. In the example shown in the Figures, the first side 42 and the second side 44 are spaced cross-vehicle from each other. For example, the first side 42 is vehicle-inboard of the second side 44 and the second side 44 is vehicle-outboard of the first side 42. The second side 44 may be adjacent a door (not numbered) of the vehicle 10 and the first side 42 may be spaced vehicle-inboard from the door of the vehicle 10.

With reference to FIGS. 1-6C, the seatback 36 and the seat bottom 38 include a seat frame 46 and a covering (not numbered) supported on the seat frame 46. The seat frame 46 may include tubes, beams, etc. Specifically, the seat frame 46 of the seatback 36 may include a pair of upright frame members (not shown). The upright frame members are elongated, and specifically, are elongated in a generally upright direction when the seatback 36 is in a generally upright position. The upright frame members are spaced from each other and the seat frame 46 includes one or more cross-members extending between the upright frame members. As shown in the Figures, the seat bottom 38 includes at least a portion of the seat frame 46. The seat frame 46 may be of any suitable plastic material, e.g., carbon fiber reinforced plastic (CFRP), glass fiber-reinforced semi-finished thermoplastic composite (organosheet), etc. As another example, some or all components of the seat frame 46 may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame 46. The padding may be between the covering and the seat frame 46 and may be foam or any other suitable material.

The seatback 36 and the seat bottom 38 define an occupant-seating area 48 of the seat 12. The occupant-seating area 48 is the area occupied by an occupant when properly seated on the seat bottom 38 and the seatback 36. The occupant-seating area 48 is in a seat-forward direction F of the seatback 36 and above the seat bottom 38. In the example shown in the Figures, the occupant-seating area 48 faces the front end of the passenger compartment 34 when the seat 12 is in the forward-facing position.

The vehicle 10 includes a seatbelt assembly 86 that includes a retractor (not shown), the webbing 26, and a latch plate 50. The webbing 26 is retractably payable from the retractor. The seatbelt assembly 86 may include an anchor (not shown) fixed relative to the seat 12. In some examples, the anchor may be fixed to the seat 12, e.g., the seat bottom 38. In other examples, the anchor may be fixed to other components of the vehicle 10, e.g., the vehicle floor 30, pillars, etc. The anchor is coupled to the webbing 26 and the anchor fixes at least one end of the webbing 26 relative to the seat 12. The latch plate 50 is engageable with the seatbelt buckle 16. In other words, the webbing 26 is engageable with the seatbelt buckle 16 by the latch plate 50. The seatbelt buckle 16 is supported by the seat 12. Specifically, as discussed further below, the seatbelt buckle 16 is rotatably supported by the seat 12. The latch plate 50 may be moveable from an unbelted position to a belted position. In other words, the latch plate 50 may be engaged with the seatbelt buckle 16 in the belted position and the latch plate 50 may be disengaged with the seatbelt buckle 16 in the unbelted position.

The seatbelt assembly 86 may control the kinematics of the occupant of the seat 12, e.g., during sudden decelerations of the vehicle 10. The webbing 26 may extend continuously from the retractor to the anchor. For example, one end of the webbing 26 feeds into the retractor and the other end of the webbing 26 is fixed to the anchor. The webbing 26 may be fabric, e.g., woven polyester. The webbing 26 is dividable into the lap portion 24 and a shoulder portion 52. The lap portion 24 and the shoulder portion 52 are defined by the latch plate 50 when the latch plate 50 is engaged with the seatbelt buckle 16. In other words, the latch plate 50 is moveable along the webbing 26 to define the lap portion 24 and the shoulder portion 52. In the belted position, the lap portion 24 may extend along a lap of an occupant of the seat 12 and the shoulder portion 52 may extend along a shoulder of the occupant of the seat 12. Specifically, the latch plate 50 divides the webbing 26 into the lap portion 24 and the shoulder portion 52 and the latch plate 50 may move freely along the webbing 26. The lap portion 24 extends from the retractor to the seatbelt buckle 16 and the shoulder portion 52 extends from the seatbelt buckle 16 to the anchor.

With reference to FIGS. 2, 2A, 4, 4A, the seatbelt buckle 16 and the plate 14 are each supported by the seat 12. Specifically, the seatbelt buckle 16 and the plate 14 are each supported by the first side 42 of the seat 12. The plate 14 is fixed relative to the seat 12. Specifically, the plate 14 is fixed relative to the seat bottom 38, e.g., the seat frame 46 of the seat bottom 38. In the example shown in the Figures, the plate 14 is fixed to the seat frame 46 of the seat bottom 38. The plate 14 may be fixed to the seat frame 46 of the seat bottom 38. The plate 14 may be concealed from view inside the passenger compartment 34. For example, the plate 14 may be between the seat frame 46 of the seat bottom 38 and the covering of the seat 12. The plate 14 may be fixed in any suitable way, e.g., fasteners, welding, unitary formation, etc. The plate 14 may be of any suitable shape. In the example shown in the Figures, the plate 14 is circular, however, the plate 14 may be of any other suitable shape, e.g., rectangular, etc. The plate 14 may be of any suitable material, e.g., steel, rigid plastic, other suitable metals, etc.

The seatbelt buckle 16 includes a buckle portion 54 and a bar portion 56. The bar portion 56 extends upwardly from the seat bottom 38 to the buckle portion 54. Specifically, the bar portion 56 includes a proximal end 58 and the bar portion 56 extends from the proximal end 58 to the buckle portion 54. The latch plate 50 engages with the buckle portion 54 when the latch plate 50 is in the belted position. The bar portion 56 may be rigid relative to the webbing 26 of the seatbelt assembly 86 between the proximal end 58 and the buckle portion 54. In other words, the bar portion 56 is not bendable relative to the webbing 26 between the proximal end 58 and the buckle portion 54.

Figure 4A:
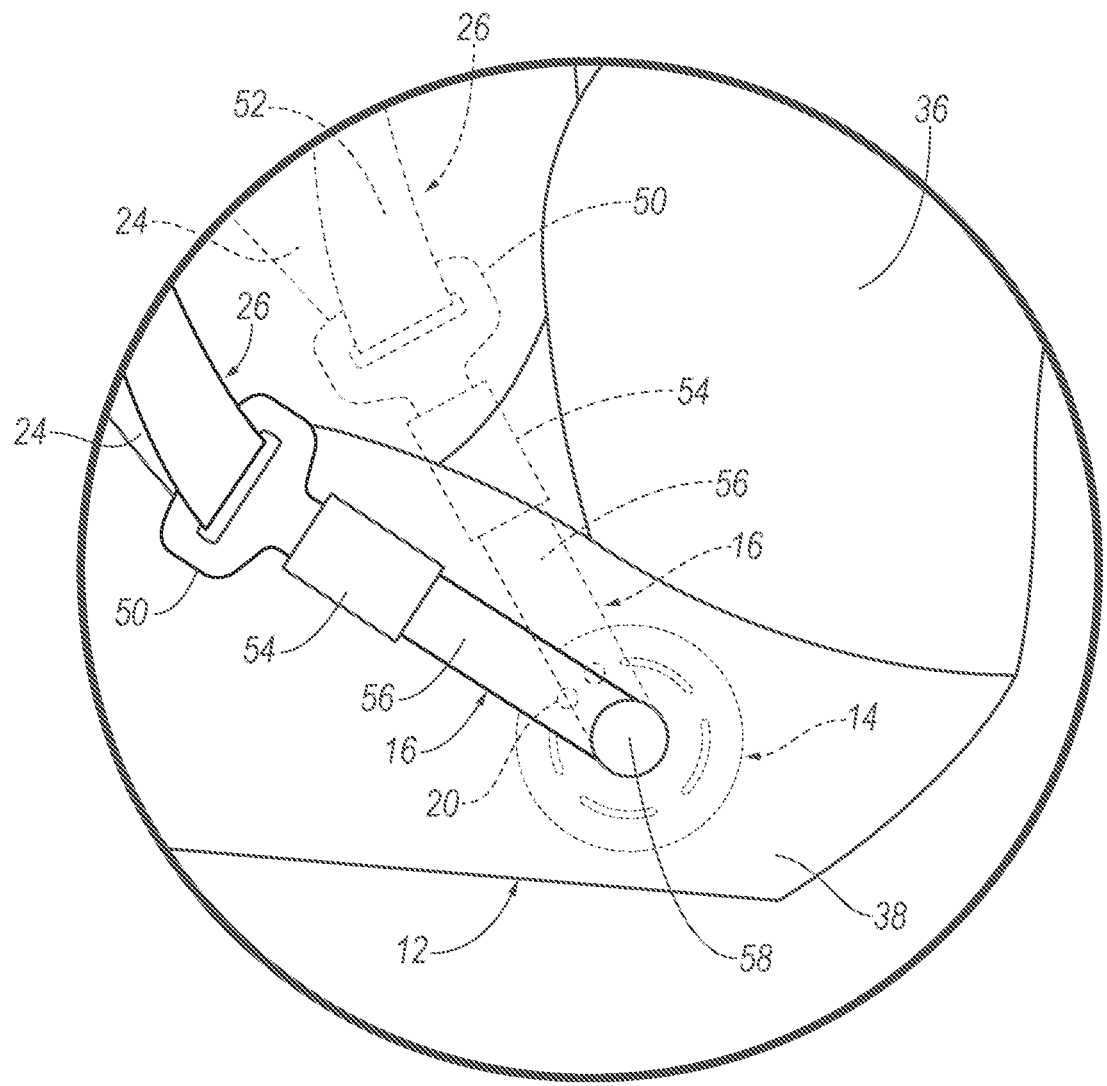
FIG. 4A is a side view of the seatbelt buckle in the second position.
Figure 5:
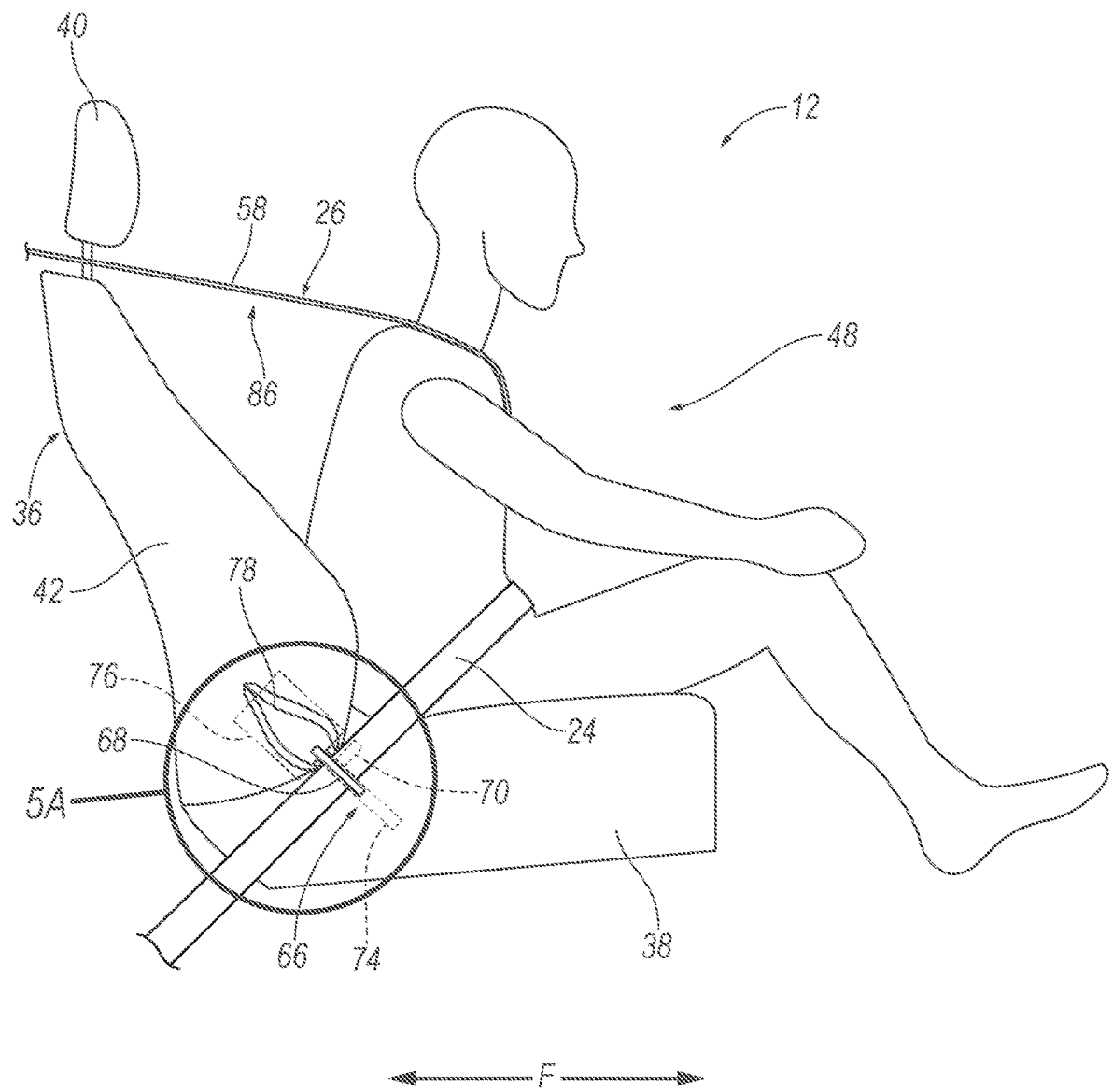
FIG. 5 is a side view of the vehicle seat having the hook assembly in a retracted position.
Figure 5A:
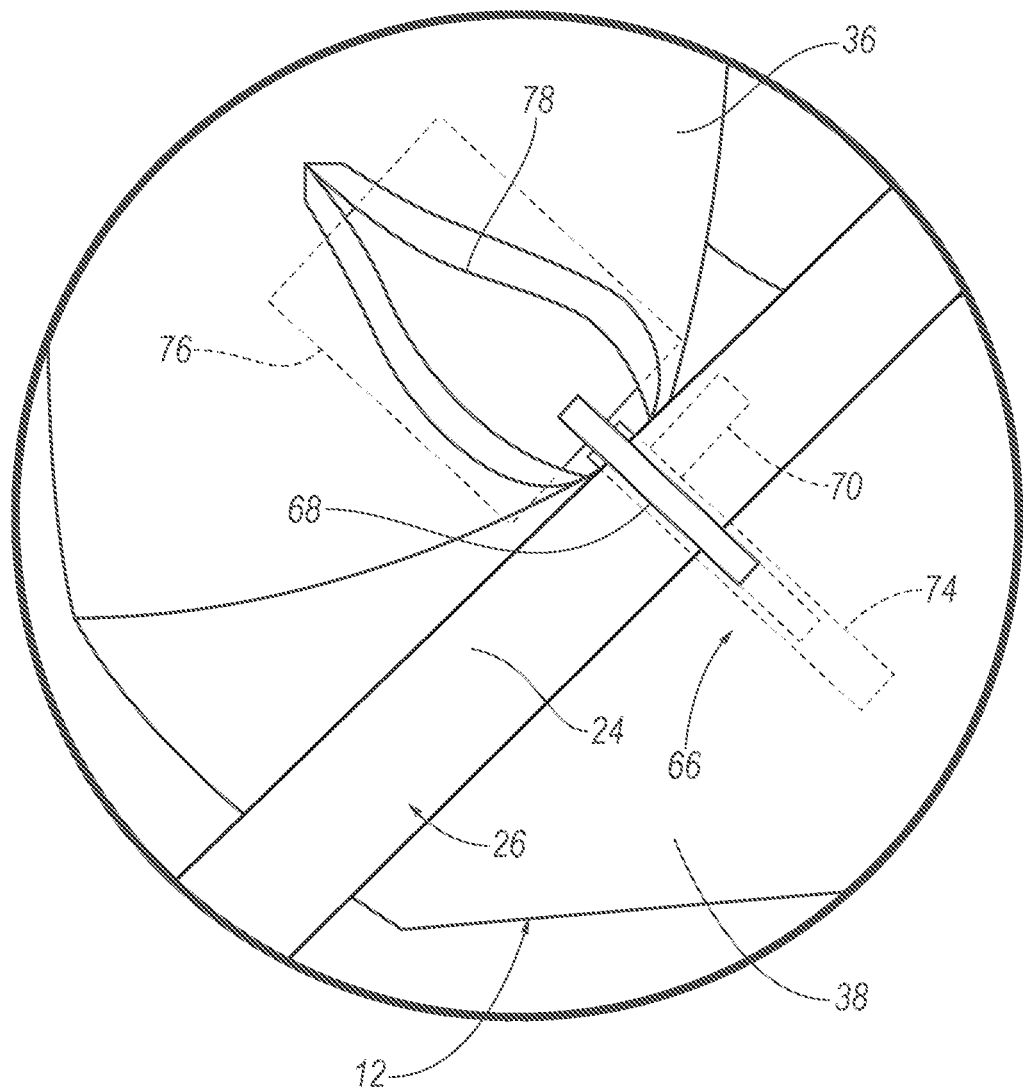
FIG. 5A is a side view of the hook assembly in the retracted position.

With reference to FIGS. 4 and 4A, in the event of certain vehicle impacts, the seatbelt buckle 16 is rotatable relative to the seat 12. The seatbelt buckle 16 is rotatably supported by the seat 12. Specifically, the seatbelt buckle 16 is rotatably supported by the seat bottom 38. The bar portion 56 of the seatbelt buckle 16 is rotatably supported by the seat bottom 38. The seatbelt buckle 16 is rotatable about a rotational axis A that is parallel to a cross-seat axis B. The cross-seat axis B is elongated from one side of the seat 12 to the other side of the seat 12. In the example shown in the Figures, the cross-seat axis B and the rotational axis A are elongated along a cross-seat direction S. The cross-seat direction S is elongated cross-vehicle. The bar portion 56 is rotatably supported by the seat bottom 38 at the proximal end 58. The seatbelt buckle 16 is rotatable relative to the seat bottom 38 and the seatbelt buckle 16 is rotatable relative to the plate 14. In other words, the seatbelt buckle 16 is rotatable relative to the seat bottom 38 and the plate 14 from the first position to the second position. Specifically, the bar portion 56 of the seatbelt buckle 16 rotates from the first position to the second position. The proximal end 58 is centered on the plate 14 and the rotational axis A. In other words, the bar portion 56 rotates about the proximal end 58 at the center of the plate 14. The seatbelt buckle 16 of any one of the seats 12 of the vehicle 10, e.g., driver seat, passenger seat, etc., may be rotatable in the event of certain vehicle impacts.

As the seatbelt buckle 16 rotates from the first position to the second position, the seatbelt buckle 16 is rotatable away from the seatback 36. In other words, as the seatbelt buckle 16 rotates from the first position to the second position, the buckle portion 54 moves in the seat-forward direction F. The buckle portion 54 moves adjacent the occupant-seat area and in the seat-forward direction F. During operation of the vehicle 10, e.g., in the absence of certain vehicle impacts, the seatbelt buckle 16 is in the first position. In the first position, the occupant of the occupant-seat area may engage the latch plate 50 of the seatbelt assembly 86 with the buckle portion 54 of the seatbelt buckle 16. When an occupant is exiting the seat 12, e.g., when the vehicle 10 is parked, the occupant may disengage the latch plate 50 from the seatbelt buckle 16. In the event of certain vehicle impacts, the seatbelt buckle 16 moves to the second position. In the event of certain vehicle impacts, an occupant of the seat 12 may move seat-forward and the seatbelt buckle 16 rotates to the second position, the lap portion 24 is moveable in the seat-forward direction F as the seatbelt buckle 16 moves from the first position and the second position.

The slot 18 is in one of the plate 14 and the seatbelt buckle 16 and the pin 20 is supported by the other of the plate 14 and the seatbelt buckle 16. In the example shown in the Figures, the slot 18 is in the plate 14. In other words, the plate 14 defines the slot 18. In such an example, the pin 20 is supported by the seatbelt buckle 16. The pin 20 is spaced from the rotational axis A. The pin 20 is spaced from the rotational axis A along the seatbelt buckle 16 and the slot 18 is spaced from the rotational axis A along the plate 14. In other words, the pin 20 and the slot 18 are each spaced from the proximal end 58 of the bar portion 56 of the seatbelt buckle 16. In other examples not shown in the Figures, the slot 18 may be in the seatbelt buckle 16, e.g., the bar portion 56 of the seatbelt buckle 16. In other words, the bar portion 56 of the seatbelt buckle 16 may define the slot 18. In such an example, the pin 20 is supported by the plate 14. The slot 18 and the pin 20 are both spaced from the rotational axis A. In both examples discussed above, the pin 20 is radially aligned with the slot 18 along the plate 14 and the seatbelt buckle 16. In other words, the pin 20 and the slot 18 spaced an equal distance from the rotational axis A.

Figure 6A:
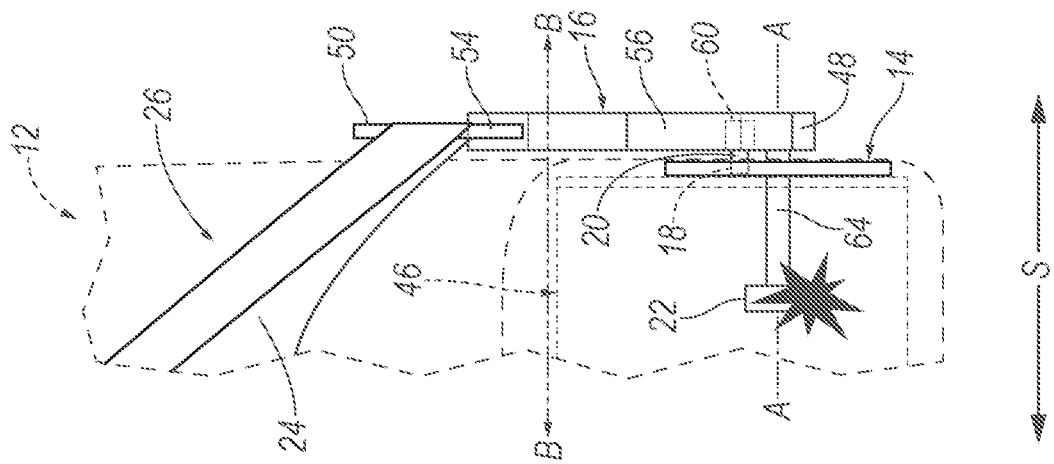
FIG. 6A is a frontal view of the seatbelt buckle in the first position and a pin supported by the seatbelt buckle in a first retracted position.
Figure 6B:
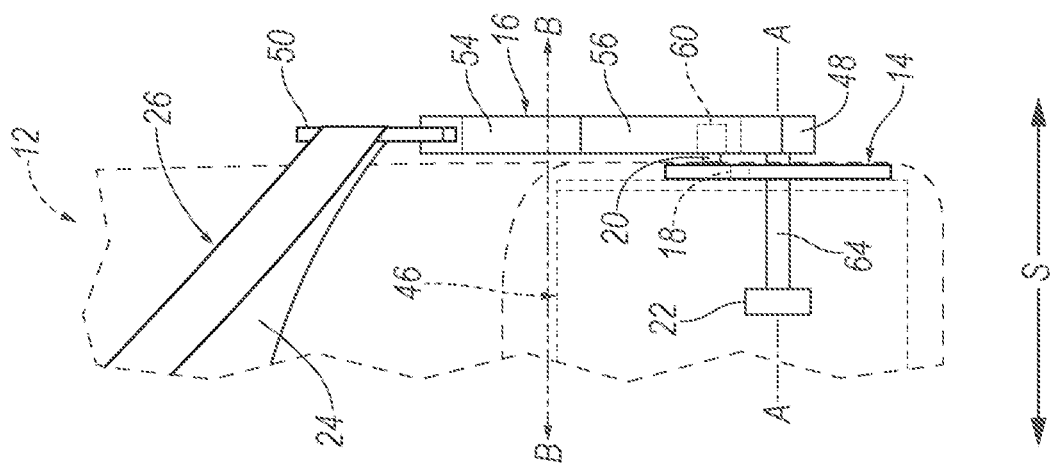
FIG. 6B is a frontal view of the seatbelt buckle in the first position and the pin supported by the seatbelt buckle in a second retracted position.
Figure 6C:
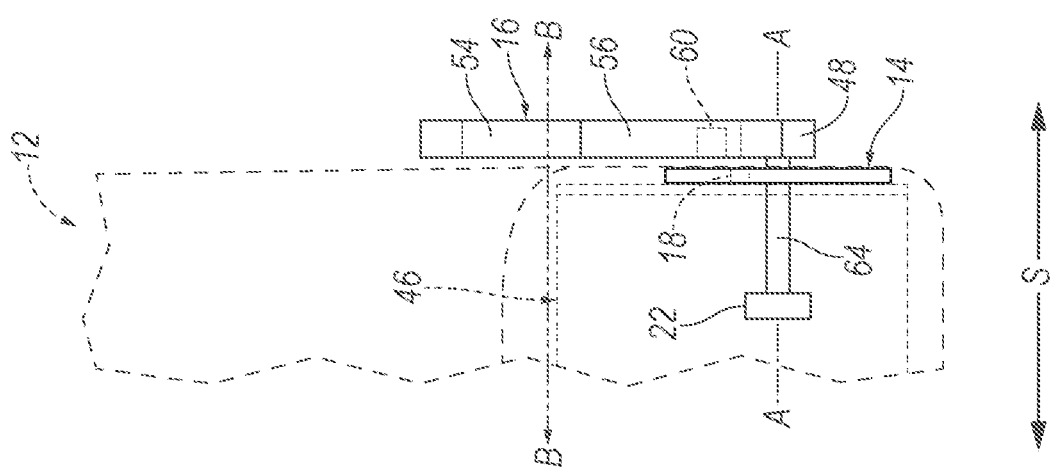
FIG. 6C is a frontal view of the seatbelt buckle in the second position and the pin in an extended position.

The pin 20 is moveable relative to one of the plate 14 and the seatbelt buckle 16 from the first retracted position (FIG. 6A) to the extended position (FIG. 6C). In the example shown in the Figures, the pin 20 is moveable relative to the seatbelt buckle 16. The pin 20 may be moveable into and out of the bar portion 56 of the seatbelt buckle 16. Specifically, the pin 20 is moveable in the cross-seat direction S. In the example shown in FIGS. 6A-C, the pin 20 is moveable from the first retracted position (FIG. 6A) to the extended position (FIG. 6C), and more specifically, the pin 20 is moveable intermediately from the first retracted position (FIG. 6A) to a second retracted position (FIG. 6B) and from the second retracted position to the extended position (FIG. 6C). The pin 20 moves in the cross-seat direction S from the first retracted position to second retracted position and the pin 20 moves in the cross-seat direction S from the second retracted position to the extended position. The pin 20 is in the first retracted position when the seatbelt buckle 16 is in the first position and the latch plate 50 is disengaged from the seatbelt buckle 16. The pin 20 moves to the second retracted position when the seatbelt buckle 16 is in the first position and the latch plate 50 is engaged with the seatbelt buckle 16. In the second retracted position, the pin 20 is slideable along the plate 14 as the seatbelt buckle 16 moves from the first position to the second position, as described further below. The pin 20 moves to the extended position in the event of certain vehicle impacts and when the seatbelt buckle 16 is in the second position. In other examples, e.g., examples wherein the pin 20 is supported by the plate 14, the pin 20 is moveable relative to the plate 14. FIG. 4A shows in hidden lines the original position, i.e., the first position, of the seatbelt buckle 16.

With reference to FIG. 6A, as discussed above, the pin 20 is in the first retracted position when the latch plate 50 is disengaged from the seatbelt buckle 16 and when the seatbelt buckle 16 is in the first position. In the example shown in the Figures, when the pin 20 is in the first retracted position and the seatbelt buckle 16 is in the first position, the pin 20 is spaced from the plate 14. In other examples, e.g., when the pin 20 is supported by the plate 14, the pin 20 is spaced from the seatbelt buckle 16 when the pin 20 is in the first retracted position and the seatbelt buckle 16 is in the first position. Specifically, in both examples above, the pin 20 is spaced from the slot 18 when the pin 20 is in the first retracted position and the seatbelt buckle 16 is in the first position. In other words, the pin 20 is spaced from the slot 18 along the rotational axis A when the pin 20 is in the first retracted position and the seatbelt buckle 16 is in the first position.

With reference to FIG. 6B, when the latch plate 50 is engaged with the seatbelt buckle 16 and when the seatbelt buckle 16 is in the first position, as discussed above, the pin 20 moves to the second retracted position toward one of the plate 14 and the seatbelt buckle 16. An actuator 60 may bias the pin 20 toward the second retracted position and the extended position in response to detected engagement of the latch plate 50 with the seatbelt buckle 16. The actuator 60 may be any suitable type of actuator 60, e.g., a lever, a spring, a solenoid including the pin 20, a motor, etc. In other words, the actuator 60 may be a mechanical actuator, e.g., coupled to the latch plate 50 to bias the pin 20, or the actuator 60 may be an electronic actuator, e.g., a solenoid, a motor, to bias the pin 20 based on communication with a vehicle computer 62. The actuator 60 may be supported by one of the plate 14 and the seatbelt buckle 16. The pin 20 may move to the second retracted position in any suitable way such that the when the latch plate 50 is engaged, the pin 20 moves toward the second retracted position, e.g., a lever, a spring, a solenoid, a motor, etc. In the example shown in the Figures, the pin 20 moves from the seatbelt buckle 16 and toward the plate 14, i.e., the actuator 60 is supported by the seatbelt buckle 16 to bias the pin 20 toward the plate 14. In such an example, the pin 20 abuts the plate 14 when the pin 20 is in the second retracted position. In other words, the pin 20 contacts the plate 14 and is not spaced from the plate 14. The pin 20 abuts the plate 14 at a position spaced from the slot 18 in the plate 14. In other words, the plate 14 is between the slot 18 and the pin 20 when the pin 20 is in the second retracted position. In other examples, e.g., when the pin 20 is supported by the plate 14, the pin 20 moves toward the seatbelt buckle 16 as the pin 20 moves to the second retracted position, i.e., the actuator 60 is supported by the plate 14 to bias the pin 20 toward the seatbelt buckle 16. In such an example, the pin 20 abuts the seatbelt buckle 16 when the pin 20 is in the second retracted position. The pin 20 may slide along the plate 14 as the seatbelt buckle 16 moves from the first position to the second position.

Once the pin 20 is in the second retracted position, the pin 20 is biased toward the extended position. The pin 20 remains in contact with one of the plate 14 and the seatbelt buckle 16 when the seatbelt buckle 16 moves to the second position. The actuator 60 may bias the pin 20 toward the extended position such that the pin 20 remains in contact with one of the plate 14 and the seatbelt buckle 16. In other words, in the event of certain vehicle impacts, the pin 20 is slidable along one of the plate 14 and the seatbelt buckle 16 as the seatbelt buckle 16 moves to the second position. In the example shown in the Figures, the pin 20 is slidable along the plate 14. In such an example, the pin 20 remains in contact with the plate 14 as the seatbelt buckle 16 moves to the second position. In other examples, e.g., when the pin 20 is supported by the plate 14, the pin 20 is slidable along the seatbelt buckle 16. In such an example, the pin 20 remains in contact with the seatbelt buckle 16 as the seatbelt buckle 16 moves to the second position.

With reference to FIG. 6C, in the event of certain vehicle impacts, the pin 20 is receivable by the slot 18. Specifically, the seatbelt buckle 16 moves to the second position and the pin 20 moves to the extended position into the slot 18. Specifically, once the seatbelt buckle 16 reaches the second position, the pin 20 moves from the second retracted position to the extended position and is received by the slot 18. In other words, the pin 20 is in the extended position and extending into the slot 18 when the seatbelt buckle 16 is in the second position. The pin 20 moves into the slot 18 when the seatbelt buckle 16 reaches the second position in the event of certain vehicle impacts. The pin 20 is biased toward the slot 18 in the extended position. In other words, the actuator 60 biases the pin 20 toward the extended position inside the slot 18. The pin 20 maintains the seatbelt buckle 16 in the second position to move the webbing 26 in the seat-forward direction F.

The first pyrotechnic device 22 is operatively coupled to the seatbelt buckle 16 to rotate the seatbelt buckle 16 from the first position to the second position. In the event of certain vehicle impacts, the first pyrotechnic device 22 activates to rotate the seatbelt buckle 16 to rotate the seatbelt buckle 16 to the second position. A shaft 64 may extend in the cross-seat direction S between the first pyrotechnic device 22 and the seatbelt buckle 16. Specifically, the shaft 64 may extend along the rotational axis A from the first pyrotechnic device 22 to the bar portion 56 of the seatbelt buckle 16. In the example in FIGS. 6A-6C, the shaft 64 extends through the plate 14, e.g., through a clearance hole. In such an example, the shaft 64 is rotatable relative to the plate 14 and the plate 14 is fixed relative to the vehicle seat 12. The shaft 64 may be connected to the seatbelt buckle 16 at the proximal end 58. The first pyrotechnic device 22 may rotate the shaft 64 to rotate the seatbelt buckle 16. The first pyrotechnic device 22 includes a pyrotechnic charge that activates to rotate the seatbelt buckle 16 to the second position. Specifically, the pyrotechnic charge actives to rotate the shaft 64 about rotational axis A, i.e., relative to the vehicle seat 12 and the plate 14, to rotate the seatbelt buckle 16 away from the seatback 36 from the first position to the second position. The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

With reference to FIGS. 1, 3, 3A, 5, and 5A, the vehicle 10 includes a hook assembly 66. The hook assembly 66 includes a hook 68, a lock 70, a second pyrotechnic device 72, and may include a track 74. In the event of certain vehicle impacts, the second pyrotechnic device 72 may be activated to allow the hook 68 to move from a first position to a retracted position. As the hook 68 moves to the retracted position, the hook 68 engages the lap portion 24 of the webbing 26 to move the lap portion of the webbing 26 seat-forward along the torso of the occupant simultaneously with the rotation of the seatbelt buckle 16. In other words, the seatbelt buckle 16 and the hook assembly 66 may move the lap portion 24 down along the torso of the occupant of the seat 12.

The hook assembly 66 is supported by the seat 12. The hook assembly 66 is fixed relative to the seat 12, e.g., the hook assembly 66 is fixed to the seat 12. In some examples, such as shown in the Figures, the hook assembly 66 is supported by the seatback 36. In such an example, the hook assembly 66 is fixed to the seat frame 46 of the seatback 36 between the seat frame 46 and the covering of the seat 12. In other examples, the hook assembly 66 may be supported by the seat bottom 38. In such an example, the hook assembly 66 is fixed to the seat frame 46 of the seat bottom 38 between the seat frame 46 and the covering of the seat 12. In yet further examples, the hook assembly 66 may be supported by any suitable portion of the seat 12. In either example discussed above, the covering of the seat 12 may include a cavity 76 surrounding the hook assembly 66 to allow movement of the seat 12 around the hook assembly 66 and the covering may include a releasable seam 78, e.g., a tear seam, adjacent the hook assembly 66.

As discussed above, the hook assembly 66 is supported by the seat 12. In other words, the hook 68 is supported by the seat 12. The track 74 is fixed to the seat 12 and the hook 68 is movable relative to the track 74 from the first position to a retracted position. Specifically, the hook 68 is retractable relative to the track 74. When the hook 68 moves to the retracted position, the hook 68 may release the releasable seam 78 to allow the hook 68 to engage the lap portion 24 of the webbing 26. The hook 68 and the track 74 are supported by the second side 44 of the seat 12. In other words, the track 74 and hook 68 are supported by an opposite side of the seat 12 from the seatbelt buckle 16. The occupant-seating area 48 of the seat 12 is between the hook 68 and the track 74 and the seatbelt buckle 16. In other words, the occupant of the seat 12 is seated between the hook 68 and the track 74 and the seatbelt buckle 16.

With continued reference to FIGS. 1, 3, 3A, 5, and 5A, the hook assembly 66 includes the lock 70 engageable with the hook 68. The lock 70 engages with the hook 68 to maintain the hook 68 in the first position during operation of the vehicle 10, e.g., in the absence of certain vehicle impacts. In the event of certain vehicle impacts, the lock 70 disengages the hook 68 to allow the hook 68 to retract to the retracted position. After the hook 68 reaches the retracted position, the lock 70 re-engages the hook 68 to maintain the hook 68 in the retracted position.

The lock 70 includes a pin (not shown), a first spring (not shown), and a housing (not numbered). The pin of the lock 70 is slidable relative to the housing. In the example shown in the Figures, the pin of the lock 70 is slidable relative to the housing from a first extended position to a retracted position and from the retracted position to a second extended position to disengage the hook 68 and to reengage the hook 68.

The hook assembly 66 includes the second pyrotechnic device 72 operatively coupled to the lock 70 to disengage the pin of the lock 70 from the hook 68. In the example shown in the Figures, the second pyrotechnic device 72 is operatively coupled to the pin of the lock 70 to retract the pin of the lock 70 from the hook 68. In the event of certain vehicle impacts, the second pyrotechnic device 72 activates to retract the pin of the lock 70 away from the hook 68 to allow hook 68 to move to the retracted position. In the event of certain vehicle impacts, the second pyrotechnic device 72 includes a pyrotechnic charge that activates to move the pin of the lock 70 from the first extended position to the retracted position. The pyrotechnic charge overcomes force of the first spring to move the pin of the lock 70 to the retracted position. The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

Figure 7:
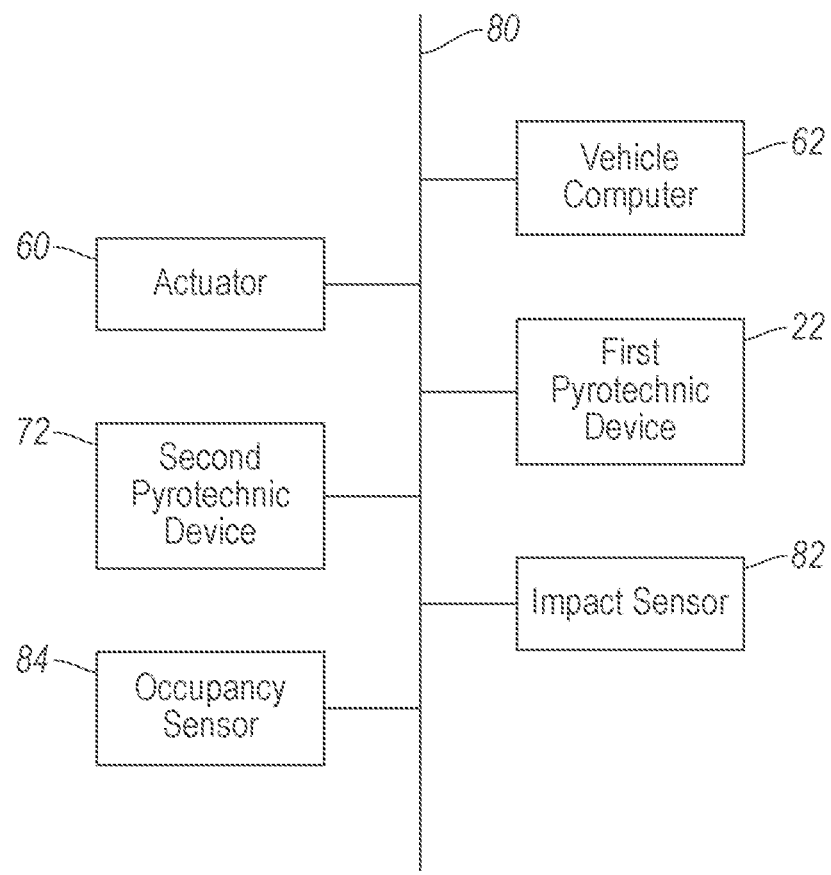
FIG. 7 is a block diagram of a vehicle communication network of the vehicle.

With reference to FIG. 7, the vehicle computer 62 includes a processor and a memory storing instructions executable by the processor. The memory includes one or more forms of computer readable media, and stores instructions executable by the vehicle computer 62 for performing various operations, including as disclosed herein. The vehicle computer 62 may be a restraints control module. The vehicle computer 62 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 62 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 62.

The vehicle computer 62 is generally arranged for communications on a vehicle communication network 80 that can include a bus in the vehicle 10 such as a controller area network CAN or the like, and/or other wired and/or wireless mechanisms. Alternatively or additionally, in cases where the vehicle computer 62 actually comprises a plurality of devices, the vehicle communication network 80 may be used for communications between devices represented as the vehicle computer 62 in this disclosure. Further, as mentioned below, various controllers and/or sensors may provide data to the vehicle computer 62 via the vehicle communication network 80.

The vehicle 10 may include at least one impact sensor 82 for sensing certain vehicle impacts (e.g., impacts of a certain magnitude, direction, etc.). The impact sensor 82 may be configured to sense certain vehicle impacts prior to impact, i.e., pre-impact sensing. The impact sensor 82 may be in communication with the vehicle computer 62. The impact sensor 82 is configured to detect certain vehicle impacts. In other words, a "certain vehicle impact" is an impact of the type and/or magnitude for which the seatbelt buckle 16 rotates from the first position to the second position, i.e., "certain" indicates the type and/or magnitude of the impact. The type and/or magnitude of such "certain vehicle impacts" may be prestored in the vehicle computer 62, e.g., a restraints control module. The impact sensor 82 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 82 may be located at numerous points in or on the vehicle 10.

The vehicle 10 may include at least one occupancy sensor 84. The occupancy sensor 84 is configured to detect occupancy of the seats 12, e.g., detect an occupant in the occupant-seating area 48. The occupancy sensor 84 may include visible-light or infrared cameras directed at the seat 12, weight sensors supported by the seat bottom 38, sensors detecting whether latch plate 50 is engaged with the seatbelt buckle 16, or other suitable sensors. The occupancy sensor 84 provides data to the computer specifying whether the seat 12 is occupied or unoccupied and information regarding the type of occupant. As one example, the vehicle 10 may include one occupancy sensor 84 for each occupant-seating area 48. As another example, the vehicle 10 may include one occupancy sensor 84 that is designed to individually detect occupancy of each occupant-seating area 48.

Figure 8:
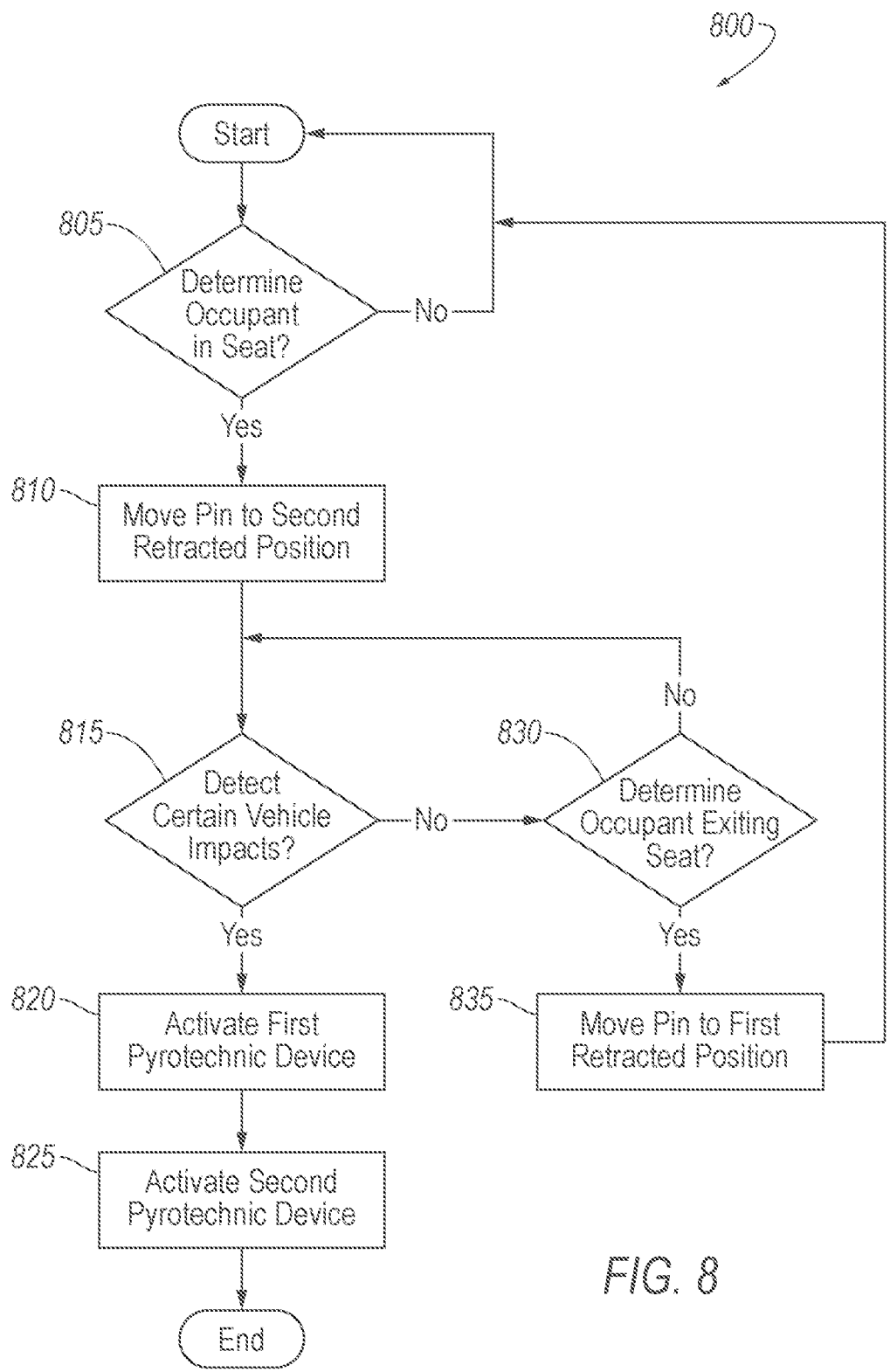
FIG. 8 is a flow chart of a method executable by a vehicle computer.

With reference to FIG. 8, the vehicle computer 62 stores instructions to control components of the vehicle 10 according to the method 800. Specifically, the computer may, in the event of certain vehicle impacts, send a signal to the first pyrotechnic device 22 to rotate the seatbelt buckle 16 to the second position and to activate the second pyrotechnic device 72 to move the hook 68 to the retracted position. Use of "in response to," "based on," and "upon determining" herein, including with reference to method 800, indicates a causal relationship, not merely a temporal relationship.

With reference to decision block 805, the method 800 includes determining whether an occupant is seated in the seat 12. The determination of whether an occupant is seated in the seat 12 includes determining that the latch plate 50 of the seatbelt assembly 86 is engaged with the seatbelt buckle 16. The occupancy sensor 84 for the seat 12 may send a signal to the vehicle computer 62 that the latch plate 50 is engaged with the seatbelt buckle 16. In other words, the engagement of the latch plate 50 with the seatbelt buckle 16 is detected to determine an occupant is seated in the seat 12. If an occupant is determined to be in the seat 12, the method 800 continues to block 810. If no occupant is determined to be in the seat 12, the method 800 returns to its start.

With reference to block 810, in response to determining an occupant is seated in the seat 12 by detecting the latch plate 50 is engaged with the seatbelt buckle 16, the method 800 includes moving the pin 20 to the second retracted position. In examples wherein the actuator 60 is an electronic actuator, block 810 may include activating the actuator 60 to bias the pin 20 toward the second retracted position. After the pin 20 moves to the second retracted position, the method 800 moves to decision block 815.

With reference to decision block 815, the method 800 includes detecting certain vehicle impacts. The impact sensor 82 may send a signal to the vehicle computer 62 that certain vehicle impacts have or will occur. If certain vehicle impacts are detected, the method 800 continues to block 820. If certain vehicle impacts are not detected, the method 800 continues to decision block 830.

With reference to block 820, in response to detection of certain vehicle impacts, the method 800 includes activating the first pyrotechnic device 22. In response to the activation of the first pyrotechnic device 22, the seatbelt buckle 16 rotates from the first position to the second position. In examples wherein the actuator 60 is an electronic actuator, the block 820 may include activating the actuator 60 to bias the pin 20 to the extended position once the seatbelt buckle 16 reaches the second position. In other examples, e.g., wherein the actuator 60 is a mechanical actuator, the actuator 60 biased the pin 20 toward the extended position automatically after the seatbelt buckle 16 reaches the second position.

With reference to block 825, the method 800 includes activating the second pyrotechnic device 72. In response to activation of the second pyrotechnic device 72, the pin disengages the hook 68 and the hook 68 moves to the retracted position. Block 825 may be executed simultaneously with block 820.

With reference to decision block 830, in response to detection of no certain vehicle impacts, the method 800 includes determining whether the occupant of the seat 12 is exiting the vehicle 10. For example, decision block 830 may include detection that the latch plate 50 is disengaged with the seatbelt buckle 16. If disengagement of the latch plate 50 with the seatbelt buckle 16 is detected, the method 800 moves to block 835. If the latch plate 50 is not disengaged from the seatbelt buckle 16, the method 800 returns to decision block 815.

With reference to block 835, in response to detection that the occupant is leaving the vehicle 10 by disengagement of the latch plate 50 from the seatbelt buckle 16, the method 800 includes moving the pin 20 from the second retracted position to the first retracted position. In examples wherein the actuator 60 is an electronic actuator, the actuator 60 may move electronically to the first retracted position. The method 800 returns to decision block 805 when the pin 20 moves to the first retracted position.

The disclosure has been described in an illustrative manner, and it is to be understood that the terminology which has been used is intended to be in the nature of words of description rather than of limitation. The numerical adjectives "first" and "second" are used herein merely as identifiers, do not signify order or importance, and may be used interchangeably. Many modifications and variations of the present disclosure are possible in light of the above teachings, and the disclosure may be practiced otherwise than as specifically described.

What is claimed is:

1. A vehicle comprising:
a vehicle seat;
a plate fixed relative to the vehicle seat;
a seatbelt buckle rotatably supported by the vehicle seat, the seatbelt buckle being rotatable relative to the plate from a first position to a second position;
a slot in one of the plate and the seatbelt buckle and a pin supported by the other of the plate and the seatbelt buckle, the pin being moveable relative to the other of the plate and the seatbelt buckle from a retracted position to an extended position;
the pin being spaced from the slot and in the retracted position when the seatbelt buckle is in the first position;
the pin being in the extended position and extending into the slot when the seatbelt buckle is in the second position; and
a pyrotechnic device operatively coupled to the seatbelt buckle to rotate the seatbelt buckle from the first position to the second position.

2. The vehicle of claim 1, wherein the vehicle seat includes a seatback, the seatbelt buckle being rotatable away from the seatback from the first position to the second position.

3. The vehicle of claim 1, wherein the vehicle seat includes a seat bottom, the plate being fixed relative to the seat bottom and the seatbelt buckle being rotatable relative to the seat bottom.

4. The vehicle of claim 1, wherein the seatbelt buckle is rotatable relative to the vehicle seat in a seat-forward direction.

5. The vehicle of claim 1, wherein the seatbelt buckle is rotatable about a rotational axis parallel to a cross-seat axis.

6. The vehicle of claim 5, wherein the pin is spaced from the rotational axis.

7. The vehicle of claim 1, further comprising a latch plate engageable with the seatbelt buckle, the pin being moveable from the retracted position to a second retracted position when the latch plate is engaged with the seatbelt buckle.

8. The vehicle of claim 7, wherein the pin abuts the other of the plate and the seatbelt buckle in the second retracted position, the pin being slidable along the other of the plate and the seatbelt buckle as the seatbelt buckle moves from the first position to the second position.

9. The vehicle of claim 7, further comprising a webbing, the latch plate being moveable along the webbing to define a lap portion, the lap portion being moveable in a seat-forward direction as the seatbelt buckle moves from the first position to the second position.

10. The vehicle of claim 1, further comprising:
a latch plate engageable with the seatbelt buckle; and
an actuator biasing the pin toward the extended position in response to detected engagement of the latch plate with the seatbelt buckle.

11. The vehicle of claim 10, further comprising a computer including a processor and a memory storing instructions executable by the processor to bias the pin toward the extended position in response to detected engagement of the latch plate with the seatbelt buckle and to bias the pin to the retracted position in response to detected disengagement of the latch plate with the seatbelt buckle.

12. The vehicle of claim 11, wherein the memory stores instructions executable by the processor to actuate the pyrotechnic device to rotate the seatbelt buckle from the first position to the second position in response to detection of certain vehicle impacts.

13. The vehicle of claim 1, wherein the pin abuts the other of the plate and the seatbelt buckle in the retracted position.

14. The vehicle of claim 1, wherein the pin moves in a cross-seat direction from the retracted position to the extended position.

15. The vehicle of claim 1, wherein the seatbelt buckle is rotatable about a rotational axis, the pin being spaced from the rotational axis along the seatbelt buckle and the slot is spaced from the rotational axis along the plate.

16. The vehicle of claim 1, further comprising a solenoid including the pin.

17. The vehicle of claim 1, wherein the pin is biased toward the slot in the extended position.

18. The vehicle of claim 1, further comprising a computer including a processor and a memory storing instructions executable by the processor to actuate the pyrotechnic device to rotate the seatbelt buckle from the first position to the second position in response to detection of certain vehicle impacts.

* * * * *